United States Patent Office 3,090,996
Patented May 28, 1963

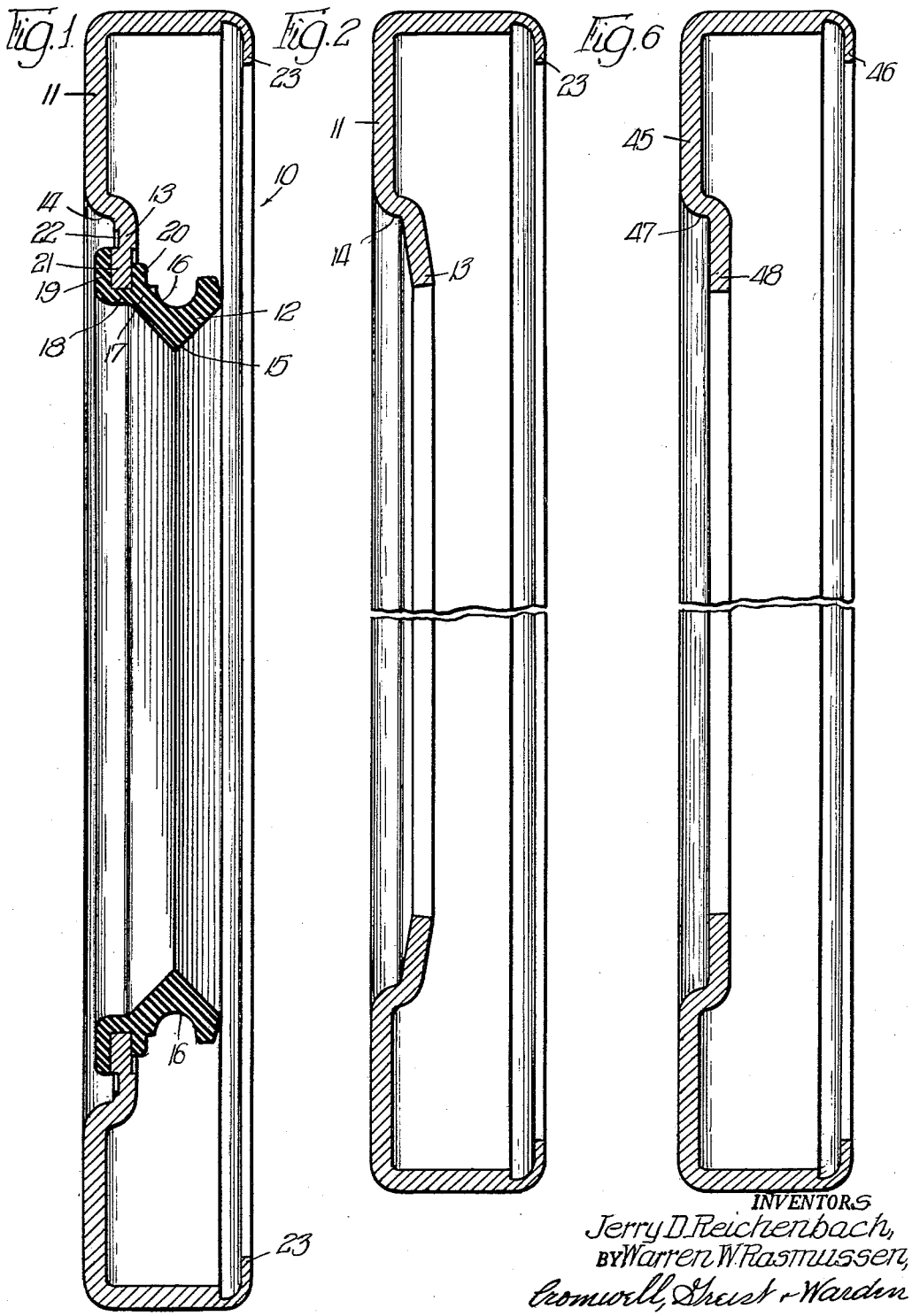
May 28, 1963  J. D. REICHENBACH ETAL  3,090,996
METHOD AND APPARATUS FOR FORMING SEALS
Filed Dec. 17, 1959  4 Sheets-Sheet 1
INVENTORS
Jerry D. Reichenbach,
BY Warren W. Rasmussen,

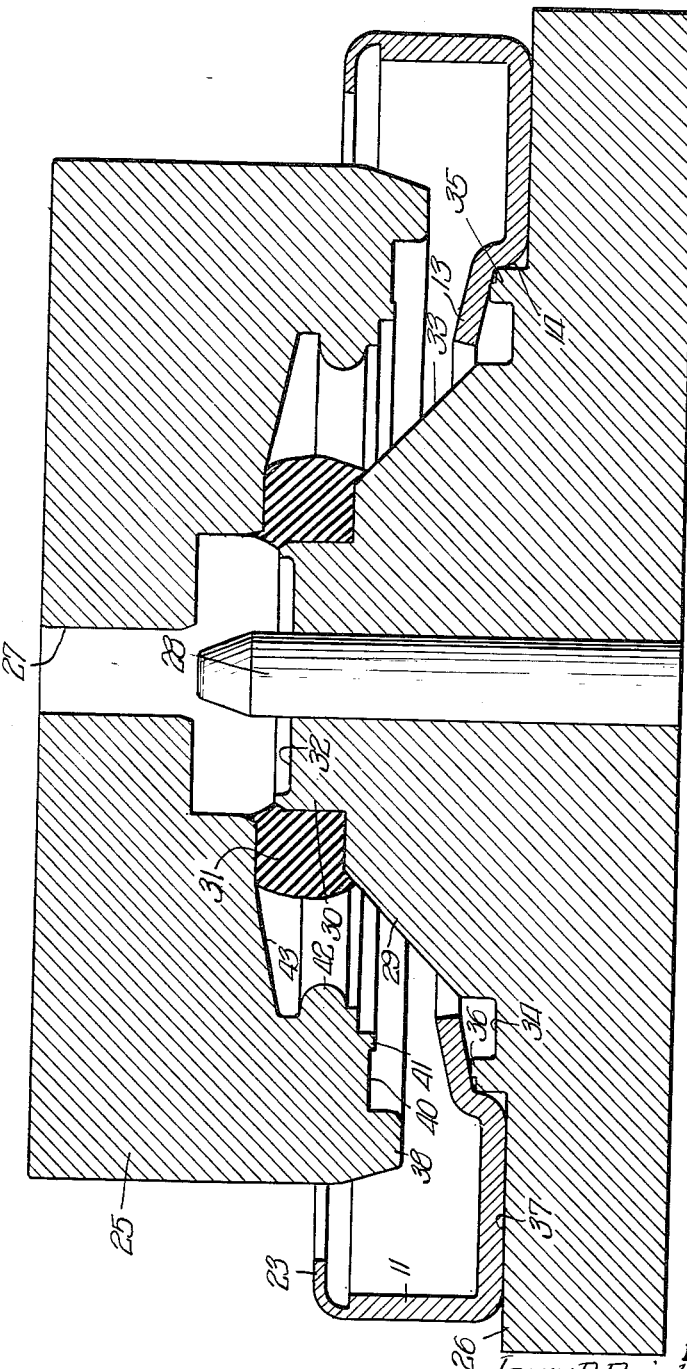

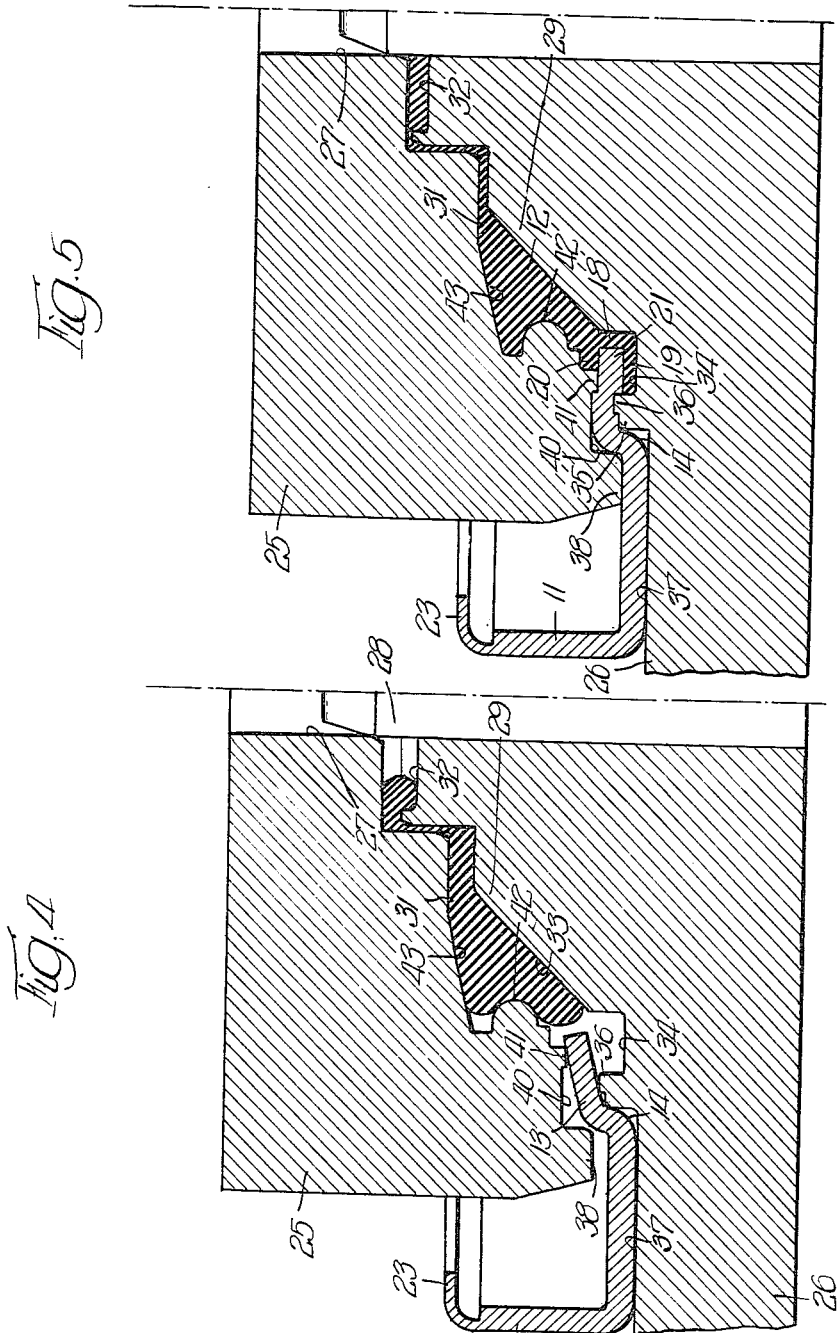

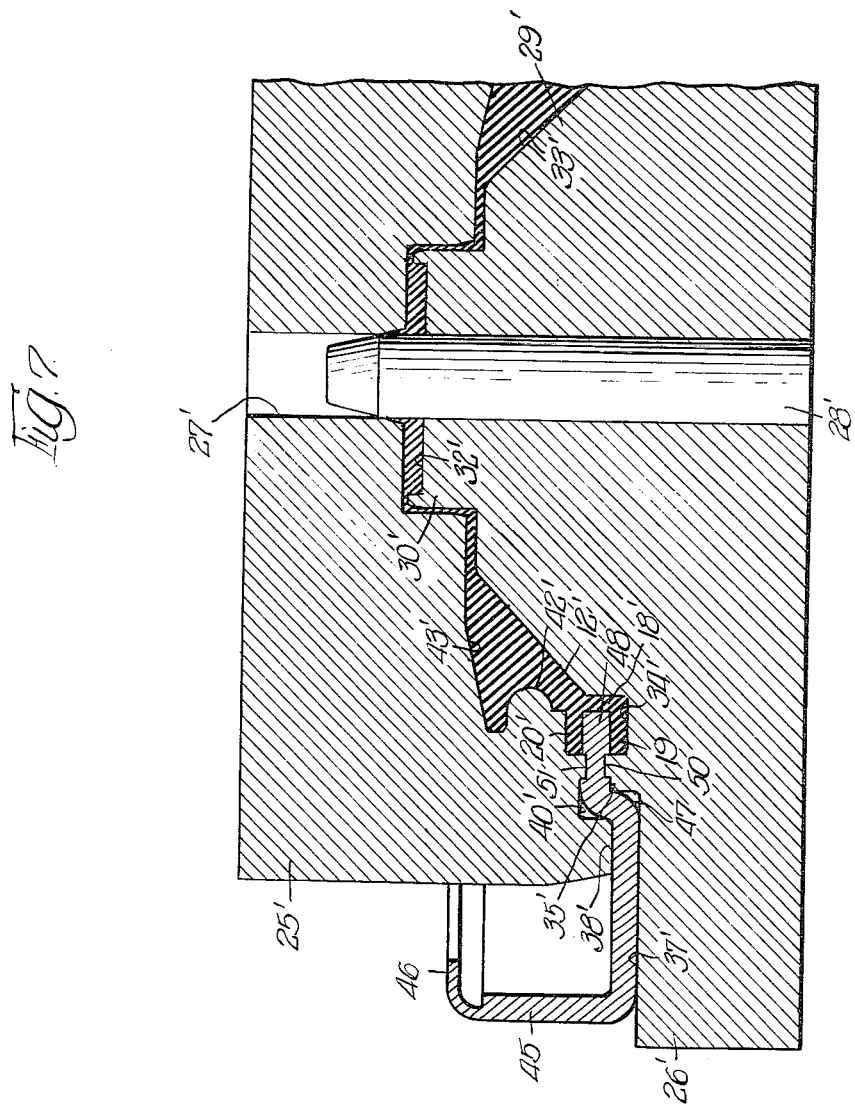

3,090,996
METHOD AND APPARATUS FOR FORMING SEALS
Jerry D. Reichenbach, Carpentersville, and Warren W. Rasmussen, Elmhurst, Ill., assignors to Chicago Rawhide Manufacturing Company, Chicago, Ill., a corporation of Illinois
Filed Dec. 17, 1959, Ser. No. 860,146
3 Claims. (Cl. 18—36)

The present invention relates to a new and improved apparatus for forming shaft-type oil seals, the apparatus being in the form of a mold with the invention also being directed to the use of a specially designed seal casing or stamping for use in combination with the mold. More specifically, the invention is directed to a method and apparatus for use in forming oil seals wherein a preformed metallic casing is centered in the mold and engaged by co-acting mold parts during flexible sealing member shaping, curing and bonding to an inner marginal portion of the casing received in the mold, and in such a manner that the margins of the flexible sealing member in the areas defining the casing bond are flash free.

It is an object of the present invention to provide a new and improved method and apparatus for forming seals, each seal including a metallic casing having a flexible sealing member bonded thereto, the bonding occurring simultaneously with the shaping and curing of the flexible sealing member.

Another object is to provide for flash free bonding of a flexible sealing member to a metallic casing during the shaping and curing of the sealing member, the casing having a portion thereof received in a sealing member shaping and curing mold constituting a part of the present invention with this portion engaged by co-acting mold parts to cooperate therewith in closing the mold and to eliminate flash formation along the margins of the bond areas.

Still a further object is to provide a new and improved method and apparatus for shaping and curing a flexible sealing member and simultaneously bonding the same to a metallic casing, the bonded areas provided being rather extensive to provide for improved adhesion between the flexible sealing member and the casing.

A further object is to provide a new and improved combination of seal casing and seal forming mold incorporating cooperative features of design to provide for new and improved bonding of a flexible sealing member to the casing simultaneous with shaping and curing of the sealing member.

Other objects not specifically set forth will become apparent from the following detailed description of the present invention made in conjunction with the accompanying drawings wherein:

FIG. 1 is an enlarged cross sectional view of a typical oil seal formed in accordance with the teachings of the present invention;

FIG. 2 is a fragmentary cross sectional view of one form of metallic casing from which the seal of FIG. 1 is made;

FIG. 3 is an enlarged fragmentary cross section of a mold incorporating the features of the present invention and illustrated in its open condition with the stamping of FIG. 2 centered therein and just prior to closing operation of the mold;

FIG. 4 is a fragmentary half-sectional view of the mold of FIG. 3 illustrating the same in its initially closed position prior to final closing thereof;

FIG. 5 is a view similar to FIG. 4 illustrating the mold in its closed position;

FIG. 6 is an enlarged fragmentary cross sectional view of a modified seal casing adapted for use in accordance with the teachings of the present invention; and FIG. 7 is an enlarged fragmentary half section of a modified form of a mold incorporating therein the principles of the present invention.

The principles of the present invention involve, among other things, the use of co-acting mold parts pressure application areas one of which cooperates with an offset or stepped inner marginal portion of a seal casing in centering the same within a mold, the pressure application areas engaging the portion of the casing received in the mold to an extent that stock material used in forming a flexible sealing member or portion within the mold cavity will not flow beyond the areas along the casing out of the mold. These pressure application areas are such that the marginal edges of the bond areas of the ultimately adhered sealing member and casing are flash free. The pressure application areas are also controlled to be at least close to overlapping and at the most radially spaced from one another no greater than to afford only slight radial clearance therebetween during co-action in the closed mold position.

FIG. 1 illustrates a finished seal 10 formed in accordance with the method of the present invention while making use of the special mold thereof. The seal 10 is a radially acting, shaft-type seal having a metallic casing 11 of annular configuration and a flexible sealing member 12 formed from any suitable rubber or rubber-like material. The casing 11 is in the form of a stamping being provided with an inner peripheral dished or offset marginal portion 13 which defines with the remainder of the casing a centering shoulder 14. The flexible sealing member 12 is of known configuration being provided with a sealing lip portion 15 for engagement with a shaft, an outer peripheral annular spring groove 16 for receiving therein a coil spring to hold the lip portion 15 in engagement with a shaft, a flexible neck-like portion 17, and a casing attaching portion 18 which is of generally U-shape in cross section and includes long and short casing bonding portions 19 and 20, respectively.

As illustrated in FIG. 1, the innermost marginal portion 21 of the casing 11 is axially offset from the remainder of the offset portion 13 beginning at a point coinciding with the outermost extension of the sealing member bonding portion 19. Radially outwardly of the sealing member bonding portion 19 the offset portion 13 is provided with an axially directed depression or groove-like deformation 22 which is formed during fabrication of the seal 10 in a manner to be described. The outer peripheral portion of the casing 11 of the seal 10 is of known configuration being provided with a rolled free margin of reduced thickness to provide the seal 10 with an inturned edge for ready installation in a shaft housing.

FIG. 2 illustrates the casing 11 in its form prior to the insertion thereof in a mold for the forming of the finished seal 10. It will be noted that in its original form prior to mold insertion, the casing 11 is shaped to include the dished or offset portion 13 which defines the centering shoulder 14. In the form illustrated in FIG. 2, the inner marginal portion 13 is inclined slightly in an axial direction.

FIG. 3 illustrates a two-part mold incorporating the design principles of the present invention. This mold is a compression mold provided with a top plate 25 and a bottom plate 26. The top plate is centrally apertured at 27 to define an opening in which is received an alignment member 28 fixedly carried by the bottom plate 26. In the relative positions shown in FIG. 3, the top plate 25 has received the upper end of the alignment member 28 in the opening 27 and is in position for movement downwardly into closed mold position with the bottom plate 26. Closing of the mold and pressure application thereto is provided by any suitable means such as a hydraulic press having platens between which the mold is positioned in the known manner.

The bottom plate 26 is provided with a raised central portion 29 having a stepped central area 30 about which a quantity of rubber or rubber-like stock material 31 of doughnut shape is placed prior to mold plate alignment and closing. The top surface of the central area 30 is provided with a flash groove 32 of known type and function. A slanted annular surface 33 and an annular groove 34 are formed in the bottom plate 26 and cooperate in defining a portion of the sealing member shaping cavity. The outer extremity of this cavity is partially defined by a raised or upwardly projecting annular rib 35 formed in the bottom plate. The rib 35 along the inner portion of the top surface thereof is provided with a circumferentially continuous, raised land 36. The top surface portion 37 of the bottom plate 36 located outwardly of the rib 35 is flat for seal casing engagement therewith.

The top plate 25 along the bottom portion thereof is provided with an outer depending rim 38 for engagement with the casing 11. A flat annular surface area 40 is located inwardly of the rim 38 and terminates in a downwardly projecting land 41. The inner side surface of the land 41 is formed continuously with a sealing member cavity-defining portion which includes a transversely inwardly projecting rib-like formation 42 which shapes the spring groove 16 of the seal 10. Upwardly of the formation 42 the bottom surface area 43 of the top plate 25 is shaped to complete the mold cavity configuration and overlie the raised central portion 29 of the bottom plate 26 to enclose the stock material 31 therewith.

In the operation of the mold of FIG. 3, the stamping 11 is centered on the bottom plate 26 prior to top plate alignment therewith. Centering is readily and efficiently accomplished without possibility of casing misalignment by engagement of the centering shoulder 14 of the casing 11 with the outer and upper surface portions of the rib 35 of the bottom plate. The offset portion 13 of the casing 11 overlies the rib 35 of the bottom plate 26 and the land 36 formed integral therewith. The arrangement described is of particular advantage with regard to virtually automatic casing alignment on the bottom plate and exact centering of the casing relative to the mold cavity for accurate bonding of a sealing member thereto. It will be appreciated that for efficient seal operation it is essential that the sealing member be accurately concentrically bonded to the casing. The structure features described provide for consistent accurate positioning of the inner marginal portion 13 of the casing within the mold cavity free of any contact between the inner marginal portion of the casing and the cavity surfaces for unimpeded stock material flow over and around the inner marginal portion of the casing and complete bonding thereto. The type of centering action illustrated and described is of such efficient character that it is necessary merely to virtually toss the casing on the bottom plate 26 in only general alignment relative to the raised central portion 29 thereof. The weight of the casing 11 itself is adequate to cause automatic centering thereof with the casing in engagement with the flat surface portion 37 of the bottom plate and the centering shoulder 14 in close engagement with the outer top edge radius of the rib 35. The provisions of cooperating radii on the casing and the rib 35 materially improve the automatic self-centering action obtained.

Following centering of the casing 11 on the bottom plate 26, the top plate 25 is brought into operative mold closing alignment with the bottom plate 26 and the stock material 31 is placed under initial compression to start flowing thereof downwardly into the mold cavity while the same is being formed during movement of the plates toward one another. FIG. 4 illustrates contact position between the mold plates and casing 11 for preliminary closing of the mold and the sealing member shaping cavity. The inner peripheral edge of the land 41 of the top plate 25 contacts the inner marginal portion 15 of the casing 11 well prior to final closing of the mold and cooperates with the outer peripheral edge of the land 36 of the bottom plate 26 to compress the inner marginal portion 13 of the casing 11 therebetween to provide for preliminary mold cavity closing to prevent the loss of stock material out of the mold cavity along the casing 11. As shown in FIG. 4, the stock material 31 flows quickly into the mold cavity area during closing thereof and, preferably, early cavity closing is brought about by land and casing contact as illustrated to prevent any possibility of stock material loss from the cavity before the mold is completely closed. In providing this operational feature, the inner marginal portion 13 of the casing 11 is inclined as originally described and the land 41 of the top plate 25 engages the casing portion 13 well prior to final closing of the mold.

FIG. 5 illustrates the mold in its fully closed position with the sealing member 12 having been shaped with the cure thereof either in progress or completed. The rim 38 of the top plate 25 engages the casing 11 outwardly of the centering shoulder 14 and the annular surface portion 40 of the top plate 25 has engaged the adjacent surface portion of the offset portion 13 of the casing. The co-acting lands 36 and 41 have been moved into closed association with one another to an extent that the same have become virtually embedded in the marginal portion 13 of the casing and in doing so, the top land 41 has caused vertical shear-like deformation of the inner peripheral portion 21 of the casing to offset this portion relative to the main portion 13.

In order to prevent flash formation along the outer edges of the portions 19 and 20 of the sealing member 12 which are bonded to the casing 11, it has been found important to locate and construct the lands 36 and 41 to cause actual embedding thereof in the casing material. With the lands 36 and 41 located as illustrated in FIGS. 3–5, the land 36 may be considered to be actually embedded in the material of the casing but it should be borne in mind that the cooperation between these lands results in the offsetting of the portion 21 relative to the portion 13 of the casing 11. Flow of stock material beyond the inner edges of the lands 36 and 41 is completely eliminated and no flash is formed. Accordingly, subsequent buffing operations to remove flash are unnecessary and the costs attendant thereto are eliminated.

The locations of the lands 36 and 41 relative to one another and with regard to the design of the mold plates carrying the same are of particular importance. It will be noted that upon separation of the mold plates the seal may be readily lifted from the bottom plate 26 and the final shaping of the sealing lip portion 15 of the sealing member 12 by lathe trimming or other suitable operation results in a completely finished seal ready for installational use. It has been found that the lands 36 and 41 should be located relative to one another so that the same are either overlapping, as will be described, or are radially spaced from one another to an extent no greater than to afford only a slight radial clearance therebetween. As illustrated in FIGS. 3–5, the lands 36 and 40 are aligned with one another so that the adjacent margins of these lands lie in the same vertical plane. In other words, the inner side surface of the land 36 and the outer side surface of the land 41 coincide and lie in the same vertical plane. However, the lands should not be radially spaced from one another to an extent that there is a substantial radial clearance therebetween to thus establish a bending torque. This is undesirable from the standpoint of control of final positioning of the inner marginal portion of the casing within the bonded portion of the sealing member and is further undesirable in that the presence of substantial bending of the casing in the mold cavity results in a decrease in sealing member bonding area by reason of appreciable radial spacing between the cooperating lands. With regard to the extent of available bonding area, it will be noted that the sealing member bonding portions 19 and 20 are rather substantial in size and engage a substantial area of the offset marginal portion 21 of the casing 11. This is an important feature from the standpoint of ultimate seal strength and adds materially to the effective life of the seal.

FIG. 6 illustrates a modified casing 45 being provided with an outer edge rolled flange 46, an inner centering shoulder 47, and an inner radially straight marginal portion 48. As compared with the casing 11 of FIG. 2, the casing 45 is of similar design with the exception that the inner marginal portion 48 thereof is radially straight and not axially inclined as in the case of the inner marginal portion 13.

FIG. 7 illustrates a mold of the same design as previously described with a modification of land location incorporated therein. Mold portions corresponding to those previously described are identified by similar primed reference numerals. The mold in FIG. 7 includes casing engaging lands 50 and 51 which directly oppose one another and are thus overlapping. The casing 45 of the FIG. 6 is illustrated as operatively inserted in the mold of FIG. 7, this mold being illustrated in its fully closed condition.

The casing 45 is centered on the bottom plate 26' of the mold of FIG. 7 in the same manner as previously described in connection with the casing 11 and the mold of FIGS. 3-5. The inner marginal portion 48 of the casing 45 extends directly into the mold cavity area and there is no provision for early closing of the mold cavity by reason of the inner marginal portion 48 being initially straight. The early mold closing feature is optional and is incorporated for use depending upon the flow characteristics of the stock material used in forming the seal. Upon final closing of the mold as shown in FIG. 7, the lands 50 and 51 become embedded in the material of the casing to cut off the flow of stock material from the mold cavity. It will be noted that with this arrangement the bond area between the sealing member and the casing is quite substantial and the bonding portions 19' and 20' of the sealing member 12' are of equal size and utilize equal bonding areas.

It will be understood that the casing 11 may also be used with the mold of FIG. 7 and the casing 45 may be readily used with the mold of FIGS. 3-5. The depressions formed in the various casings by the co-acting lands described have been exaggerated in the drawings to clearly illustrate the same. Also in this respect, the degree of offset of the marginal portion 21 of the casing 11 as shown in FIGS. 1 and 5 is somewhat exaggerated. It will be borne in mind that the extent to which the lands deform the casing will depend upon the molding pressures utilized. It will also be understood that the pressure application areas defined by the lands may vary considerably and that the drawings forming a part of this application contain views which are greatly enlarged as compared to actual size.

Obviously certain modifications and variations of the invention as hereinbefore set forth may be made without departing from the spirit and scope thereof, and therefore only such limitations should be imposed as are indicated in the appended claims.

We claim:

1. The method of forming a seal having a molded rubber-like sealing portion bonded to a metallic casing, said method comprising enclosing a marginal portion of said casing within a sealing portion shaping curing mold between flat co-acting radially offset pressure application areas, compressing said marginal portion between said pressure application areas to an extent that stock material used in forming said sealing portion will not flow beyond said areas along said casing out of said mold, the relative location of said pressure application areas being controlled to range from opposed marginal overlapping only to an extent that co-acting adjacent margins lie in the same plane to opposed marginal radial spacing of no greater than to afford only slight radial clearance therebetween whereby the inner edge portion of said marginal portion in its final position is radially offset into a plane which is at least substantially parallel to the remainder of said marginal portion with the thickness of the metal of said casing in the zone of displacement being reduced.

2. A mold for forming a seal, said mold comprising at least a pair of cooperating parts which define therebetween a mold cavity for use in forming a flexible sealing member, a portion of said cavity being closed off by substantially flat surface and sharp edge cooperating lands carried by said parts and the inner marginal portion of a metallic seal casing received between said lands and projecting into said cavity, said lands engaging said casing on opposite surfaces thereof and defining radially offset casing pressure application areas, which areas are located relative to one another within a range of adjacent margins lying in the same plane to said margins being in only slightly radially spaced co-acting relationship to locate the inner edge portion of said marginal portion in a radially offset plane which is at least substantially parallel to the remainder of said marginal portion with the thickness of the metal of said casing in the zone of displacement being reduced.

3. A mold for forming a seal, said mold comprising co-acting top and bottom plates having cooperating parts which define a sealing member shaping and curing cavity, said bottom plate having an upwardly projecting flat top and sharp edge circumferential land located radially outwardly of the cavity defining part of said bottom plate, said bottom plate land being adapted to receive a metallic annular seal casing thereabout for centering by engagement with an offset shoulder portion formed in said casing with an inner marginal portion of said casing overlying said bottom plate land and projecting into the cavity defining part of said bottom plate, said top plate being provided with a downwardly projecting flat top and sharp edge circumferential land defining the outer periphery of the cavity defining part of said top plate and arranged for engagement with the inner marginal portion of said casing on the opposite surface thereof relative to said bottom plate land, said top and bottom plate lands being radially offset and being located relative to one another that upon closing of said mold with a casing centered on said bottom plate adjacent side margins of said lands are either lying in the same plane or are only slightly radially offset sufficiently to afford slight clearance therebetween, said lands engaging the inner marginal portion of said casing therebetween to compress the same and to locate the inner edge portion of said marginal portion in a radially offset plane which is at least substantially parallel to the remainder of said marginal portion with the thickness of the metal of said casing in the zone of displacement being reduced.

References Cited in the file of this patent

UNITED STATES PATENTS

| 2,661,498 | Blaurock | Dec. 8, 1953 |
| 3,004,298 | Haynie | Oct. 17, 1961 |

FOREIGN PATENTS

| 493,009 | Great Britain | Sept. 30, 1938 |
| 1,046,916 | France | July 15, 1953 |